(12) United States Patent
Le Morvan

(10) Patent No.: US 8,630,079 B2
(45) Date of Patent: *Jan. 14, 2014

(54) ANTI-STATIC AND LIGHTNING COMPATIBLE TRANSPORT ELEMENT

(75) Inventor: Christophe Le Morvan, Le Gros Theil (FR)

(73) Assignee: Aerazur S.A. (FR)

( * ) Notice: Subject to any disclaimer, the term of this patent is extended or adjusted under 35 U.S.C. 154(b) by 5 days.

This patent is subject to a terminal disclaimer.

(21) Appl. No.: 13/229,834

(22) Filed: Sep. 12, 2011

(65) Prior Publication Data

US 2012/0063053 A1 Mar. 15, 2012

Related U.S. Application Data

(60) Provisional application No. 61/403,159, filed on Sep. 10, 2010.

(51) Int. Cl.
*H05F 3/00* (2006.01)

(52) U.S. Cl.
USPC ............................................. 361/220

(58) Field of Classification Search
USPC ............................ 361/212, 215, 220
See application file for complete search history.

(56) References Cited

U.S. PATENT DOCUMENTS

| | | | |
|---|---|---|---|
| 3,913,625 A | 10/1975 | Gazda et al. | |
| 5,052,444 A * | 10/1991 | Messerly et al. | 138/125 |
| 5,973,903 A | 10/1999 | Tomerlin | |
| 2010/0116941 A1 | 5/2010 | Ciolcyzk | |

FOREIGN PATENT DOCUMENTS

| | | |
|---|---|---|
| DE | 3202854 | 8/1983 |
| EP | 0707169 | 4/1996 |
| WO | 2012032406 | 3/2012 |

OTHER PUBLICATIONS

Lueggert, EP0707169, Apr. 17, 1996, (Machine Translation).*
International Search Report and Written Opinion dated Jun. 15, 2012 Application No. PCT/IB2011/002121.
Annex to Form PCT/ISA/206 Communication Relating to the Results of the Partial International Search dated Feb. 22, 2012 in Application No. PCT/IB2011/002121.
International Preliminary Report on Patentability dated Mar. 21, 2013 in Application No. PCT/IB2011/002121.

* cited by examiner

*Primary Examiner* — Jared Fureman
*Assistant Examiner* — Kevin J Comber
(74) *Attorney, Agent, or Firm* — Dean W. Russell; Tiffany L. Williams; Kilpatrick Townsend & Stockton LLP

(57) ABSTRACT

Described are transport elements for dissipating electrostatic charge including at least two outer structural layers coupled in an overlapping arrangement. Some examples may include a transport element having an inner structural layer coupled to an inner surface of the at least two outer structural layers. Other examples may include an outer resin layer coupled to the outer surface of the at least two outer structural layers, wherein the outer resin layer comprises materials that display a distinctive appearance when viewed under an ultraviolet light. An electrical resistance per length of the outer structural layers, the inner structural layer, and/or the outer resin layer is about $10^5$ to $10^9$ Ω/meter.

10 Claims, 4 Drawing Sheets

ANTI-STATIC AND LIGHTNING COMPATIBLE TRANSPORT ELEMENT

CROSS REFERENCE TO RELATED APPLICATIONS

This application is related to and claims priority benefits from U.S. Provisional Application Ser. No. 61/403,159, filed on Sep. 10, 2010, entitled ANTI-STATIC AND LIGHTNING COMPATIBLE PIPE ASSEMBLY FOR CARRYING FLAMMABLE FLUIDS IN AERONAUTICAL APPLICATION. The '159 application is hereby incorporated in its entirety by this reference.

FIELD OF THE INVENTION

The field of the invention relates to composite pipe assemblies that are anti-static and lightning compatible and more particularly, although not necessarily exclusively, to composite pipe assemblies intended to carry flammable fluids particularly in an aerospace environment.

BACKGROUND

Aircraft must function in all weather environments. Many aircraft experience electromagnetic threats produced in such environments, such as lightning strikes, electrostatic charge buildup, and precipitation static. These electrostatic events can cause severe and unexpected degradation to aircraft and hazards to crew and passengers.

Many traditional aircraft designs, particularly those having metallic transport elements in combination with aluminum wing skins, include the proper electrical architecture to mitigate ignition hazards associated with a lightning strike or electrostatic charge buildup due to the identical electrical potential between the two materials.

As aircraft design has transitioned to composite wing designs, the composite materials have created a difference in the aircraft ground potential and that of associated aircraft systems. Addressing these differences in ground potential through various designs has resulted in additional complexity and weight to the aircraft design. Thus, it is desirable to develop light-weight, electrostatic and lightning compatible transport elements that are able to eliminate the differences in ground potential without adding weight or complexity to the aircraft design.

SUMMARY

Embodiments of the present invention include a transport element for dissipating electrostatic charge comprising at least two outer structural layers coupled in an overlapping arrangement. Each outer structural layer may be formed of a combination of resin and at least one of glass fibers, carbon fibers, and polyaramide fibers. Each outer structural layer may also be overlapped by the other outer structural layer by at least 50%.

In some embodiments, the transport element may further comprise an inner structural layer coupled to an inner surface of the outer structural layers, wherein the inner structural layer comprises thermoplastic materials that may be formed into a nonlinear shape without loss of structural integrity.

In other embodiments, the transport element may further comprise an outer resin layer coupled to an outer surface of the outer structural layers, wherein the outer resin layer comprises materials that display a distinctive appearance when viewed under an ultraviolet light.

An electrical resistance per length of the outer structural layers, the inner structural layer, and/or the outer resin layer is about $10^5$ to $10^9$ $\Omega$/meter.

In some embodiments, transport elements may be coupled by positioning the end of a first transport element adjacent the end of a second transport element, at least partially enclosing a cross-piece within the adjacent ends, overwrapping the adjacent ends with an additional outer structural layer to form an overwrapping section, and curing the overwrapping section.

In other embodiments, the transport element may be repaired by removing a damaged section from the transport element to form a gap within the transport element and two exposed edges adjacent opposing sides of the gap, positioning a cross-piece comprising two ends within the gap so that each of the two ends at least partially encloses each of the two exposed edges, overwrapping each end with an additional outer structural layer to form an overwrapping section, and curing the overwrapping section.

DETAILED DESCRIPTION

Embodiments of the invention provide transport elements that are electrostatic and lightning compatible. While the transport elements are discussed for use with aircraft fuel systems, they are by no means so limited. Rather, embodiments of the transport elements may be used in fuel systems of any type or otherwise as desired.

Figure 1:
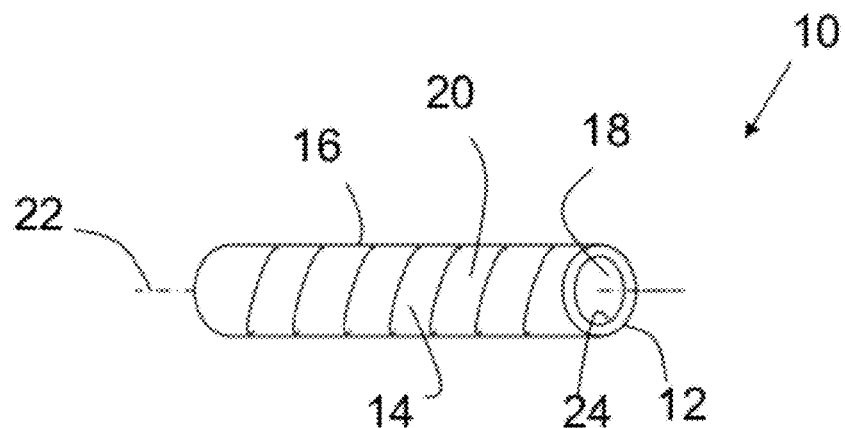
FIG. 1 is a perspective view of a transport element according to certain embodiments of the present invention.
Figure 2:
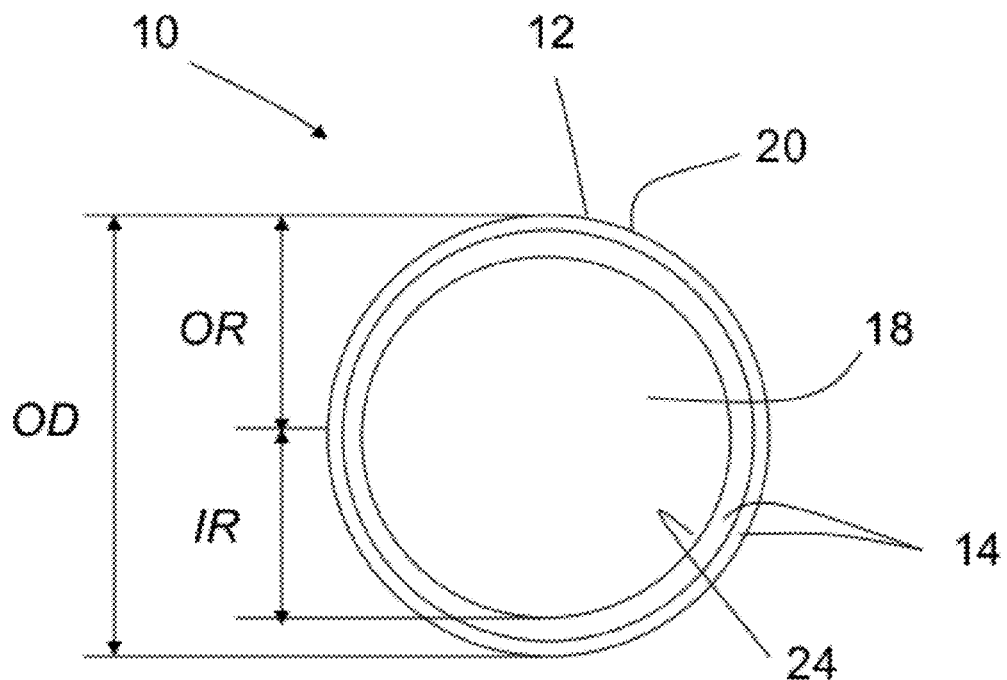
FIG. 2 is a front view of the transport element of FIG. 1.

FIGS. 1-6C illustrate embodiments of a transport element 10. As shown in FIGS. 1-2, the transport element 10 comprises at least one pipe 12. In some embodiments, as shown in FIG. 2, the pipe 12 is formed from at least two outer structural layers 14, each outer structural layer 14 comprising resin and reinforcement fibers. The fibers may include but are not limited to glass fibers, carbon fibers, polyaramide fibers, other suitable fibers, or a combination thereof. One of ordinary skill in the relevant art will understand that any suitable fibers may be used to form each outer structural layer 14. In these embodiments, the fibers are coated with resin. The type of resin used may include but is not limited to epoxy, polyester, vinyl ester, phenolic, cyanate ester, bismaleimide, other similar thermoset resins, polyetheretherketone (PEEK), polyetherketone (PEK), polyphenylsulfone (PPSU), polyphenylsulfide (PPS), polyetherimide (PEI), polyamideimide (PAI), polyimide (PI), vinylidene polyfluoride (PVDF), polyamide (PA), polyphthalamide (PPA), other thermoplastic materials, or other suitable materials. In some embodiments, each outer structural layer 14 overlaps the other outer structural layer 14 by at least 50%. However, one of ordinary skill in the relevant art will understand that any suitable overlapping arrangement may be used depending on the number of outer structural layers 14.

In some embodiments, the outer structural layers 14 are arranged to form a generally cylindrical shape 16 having an opening 18. As best shown in FIG. 2, the cylindrical shape 16 may have an outer surface 20 positioned a distance OR from a central axis 22 of the opening 18 and an inner surface 24 positioned a distance IR from the central axis 22 of the opening 18. The wall thickness (defined as OR−IR) is determined with respect to the pipe pressure and vibration requirements.

The combination of resin, fiber orientation, and pipe geometry result in a pipe design having sufficient rigidity to satisfy aircraft vibration requirements, while also having sufficient flexibility to support the flexibility of the wing design.

Figure 3:
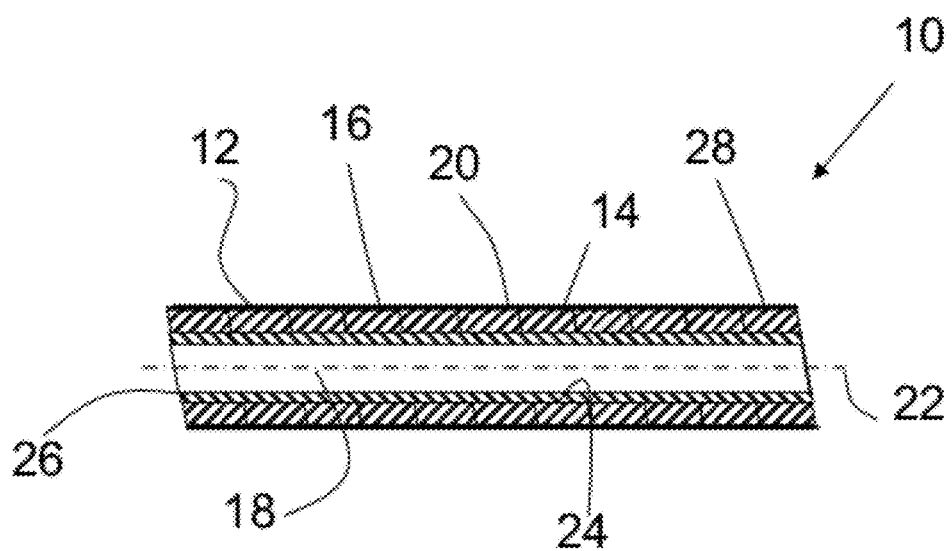
FIG. 3 is a cross-sectional view of a transport element according to other embodiments of the present invention.
Figure 4:
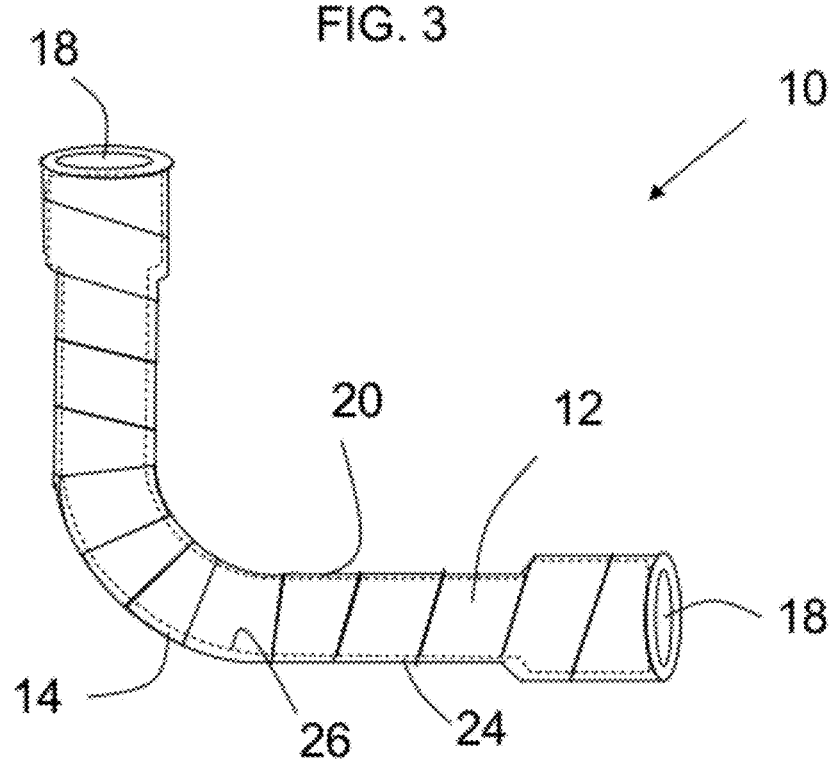
FIG. 4 is a perspective view of the transport element according to yet other embodiments of the present invention.

In some embodiments, as illustrated in FIGS. 3 and 4, an inner structural layer 26 may be coupled to the inner surface 24 of the shape 16. The inner structural layer 26 may be formed of materials including but not limited to polyetheretherketone (PEEK), polyetherketone (PEK), polyphenylsulfone (PPSU), polyphenylsulfide (PPS), polyetherimide (PEI), polyamideimide (PAI), polyimide (PI), vinylidene polyfluoride (PVDF), polyamide (PA), polyphthalamide (PPA), other thermoplastic materials, or other suitable materials that are capable of being formed into a desired shape without loss of structural integrity. As a result, the inner structural layer 26 may form a thermoplastic core that may be formed into pipes 12 with nonlinear shapes, such as the pipe 12 illustrated in FIG. 4. In some embodiments, the inner structural layer 26 is formed into the desired shape prior to coupling with the outer structural layers 14.

In certain embodiments, as illustrated in FIG. 3, an outer resin layer 28 may be coupled to the outer surface 20 of the shape 16. The outer resin layer 28 may be formed of materials including but not limited to fluorescent particles or microcapsules treated with a specific dye. The outer resin layer 28 may be included with straight or nonlinear shaped pipes 12. When the pipe 12 suffers an impact, the outer resin layer 28 may crack. The crack in the outer resin layer 28 causes the fluorescent particles or microcapsules to display a fluorescent or dye distinctive spot when viewed under an ultraviolet light.

Multiple pipes 12 may be coupled to one another in a manner that ensures consistent electrical conductivity and constant inner diameter. Maintaining these properties at a constant value or size may be of particular importance in fuel-carrying applications, but may also be desirable properties in applications of any kind.

Figure 5A:
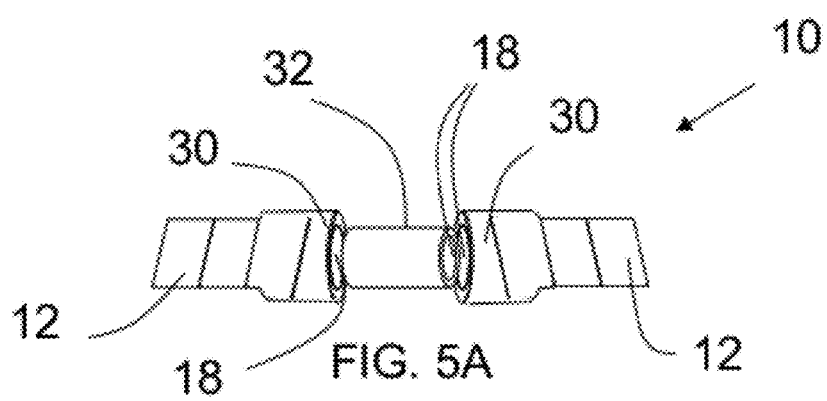
FIG. 5A is a side perspective view two transport elements of FIG. 1 positioned adjacent a cross-piece.

FIGS. 5A-D illustrate certain embodiments of a method of coupling pipes 12. In these embodiments, as shown in FIG. 5A, two pipes 12 are positioned lengthwise so that an end 30 of each pipe 12 is adjacent the corresponding end 30 of the other pipe 12. A cross-piece 32 is positioned between the two ends 30. As shown in FIG. 5A, the ends 30 of each pipe 12 may have a wider opening 18 than the opening 18 that passes through the remainder of the pipe 12. In some embodiments, the openings 18 of each end 30 are shaped so that the inner surface 24 (or the inner structural layer 26) of the end 30 approximates an outer cross-sectional shape of a cross-piece 32 to be inserted within each end 30. For example, in some embodiments, the inner surface 24 (or the inner structural layer 26) of each end 30 is positioned approximately a distance OR from the central axis 22 (as defined in the non-expanded sections of the pipe 12 and illustrated in FIG. 2) in the case where the cross-piece 32 has an outer surface 20 positioned approximately a distance OR from the central axis 22. However, one of ordinary skill in the relevant art will understand that any suitable shape of the ends 30 may be used that allows each end 30 to at least partially enclose the cross-piece 32.

The cross-piece 32 may further comprise a length that is approximately four times the distance OR (or twice a distance OD, as shown in FIG. 2), but may also have any suitable length that provides sufficient stability to the coupling location between the pipes 12. Because each end 30 is shaped to accommodate the overall geometry of the cross-piece 32, in these embodiments, the length of each end 30 is approximately one-half the length of the cross-piece 32. In other words, each end 30 has a length that is approximately two times the distance OR (or approximately equal to the distance OD).

Figure 5B:
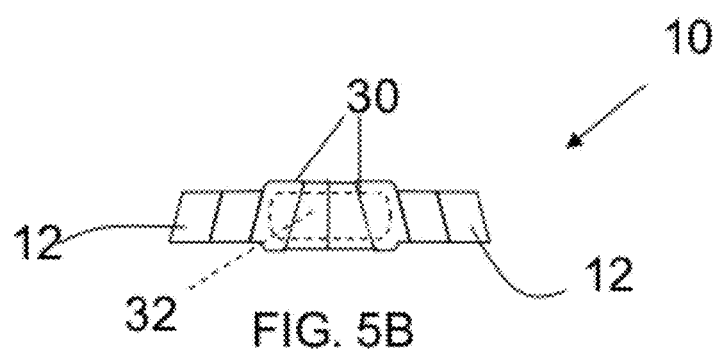
FIG. 5B is a side view of the two transport elements of FIG. 5A after insertion of the cross-piece.
Figure 5C:
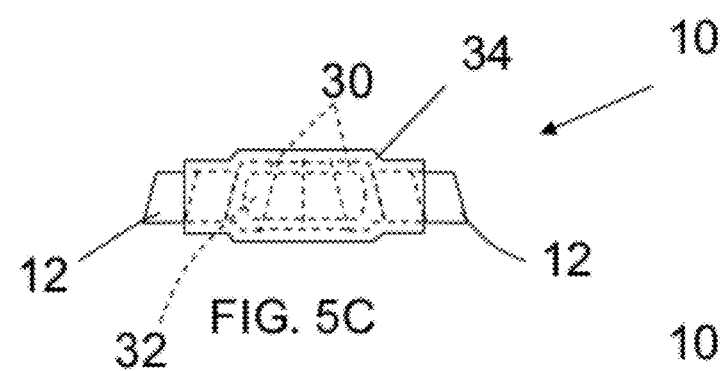
FIG. 5C is a side view of the two transport elements of FIG. 5B after installation of an overwrapping section.

Once the cross-piece 32 has been at least partially enclosed by the two ends 30, as illustrated in FIG. 5B, the area may be wrapped with another outer structural layer 14 to form an overwrapping section 34. In some embodiments, the length of the overwrapping section 34 is approximately eight times the distance OR (or four times the distance OD), but may also have any suitable length that provides sufficient stability to the pipe 12 adjacent the coupling location.

Figure 5D:
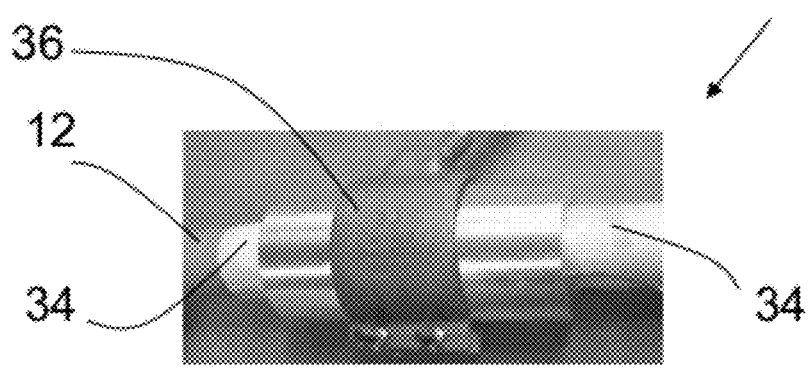
FIG. 5D is a side perspective view of the two transport elements of FIG. 5C during curing.

The entire assembly (overwrapping section 34, ends 30, and cross-piece 32) is then cured with a mobile unit 36, as shown in FIG. 5D. The curing process applies heat and pressure to the overwrapping section 34, ends 30, and cross-piece 32, which causes these components to bond to one another. The inner surface 24 of the cross-piece 32 is configured to substantially align with the inner surface 24 of the pipe 12, which ensures a constant inner diameter.

In some embodiments, a similar process may be used to repair a damaged or failing section of the pipe 12 in a manner that ensures consistent electrical conductivity and a constant inner diameter. In these embodiments, the damaged or failing section of the pipe 12 is removed, which forms a gap within the pipe 12 and creates exposed edges of the pipe 12 adjacent opposing sides of the gap.

In the repair process, similar to the coupling process discussed above, the cross-piece 32 is positioned within the gap adjacent the exposed edges of the pipe 12. In these embodiments, the widened ends 30 are positioned on the cross-piece 32, as opposed to the pipe 12. As a result, the ends 30 of the cross-piece 32 are configured to at least partially enclose the exposed edges of the pipe 12 instead of having the two ends 30 of the pipe 12 at least partially enclose the cross-piece 32.

In some embodiments, as discussed above, the inner surface 24 (or the inner structural layer 26) of each end 30 is positioned approximately a distance OR from the central axis 22 (as defined in FIG. 2) in the case where the exposed edges of the pipe 12 have an outer surface 20 positioned approximately a distance OR from the central axis 22. However, one of ordinary skill in the relevant art will understand that any suitable shape of ends 30 may be used that allows each end 30 to at least partially enclose the exposed edges of the pipe 12.

Each end 30 of the cross-piece 32 may further comprise a length that is approximately two times the distance OR (or the distance OD, as shown in FIG. 2), but may also have any suitable length that provides sufficient stability to the repair location within the pipe 12.

Once each end 30 of the cross-piece 32 has been fitted over each exposed edge of the pipe 12, the bonding steps are similar to those for coupling two pipes 12. Specifically, each end 30 is wrapped with another outer structural layer 14 to form the overwrapping section 34. In some embodiments, the length of the overwrapping section 34 is approximately four times the distance OR (or two times the distance OD), but may also have any suitable length that provides sufficient stability to the pipe 12 adjacent the point of failure or damage.

The entire assembly (overwrapping section 34, the end 30, and the exposed edge of the pipe 12) is then cured with the mobile unit 36. The curing process applies heat and pressure to the overwrapping section 34, the end 30, and the exposed edge of the pipe 12, which causes these components to bond to one another. The inner surface 24 of the cross-piece 32 is configured to substantially align with the inner surface 24 of the pipe 12, which ensures a constant inner diameter.

The electrostatic charge dissipation characteristics of the pipe 12 are based on the fact that all of the materials comprising the various layers 14, 26, 28 are electrostatic dissipating materials. Adequate bonding between these conductive materials allows electrical charges to flow freely between the materials, resulting in no difference in electrical potential.

To demonstrate the homogeneity among the conductive materials in the pipe 12, three different configurations involving the pipe 12 in combination with various internal electrodes 38 and external electrodes 40 were assembled, a charge of 50 V was applied to each configuration, and the electrical resistance for each configuration was measured. Each of these tests was performed using a straight pipe 12 with ferrules, where the pipe 12 measured 555 mm.

Figure 6A:
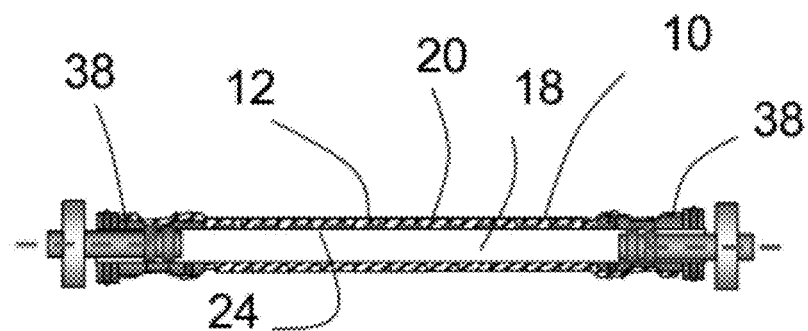
FIG. 6A is a side cross-sectional view of the transport element of FIG. 1 with two internal electrodes positioned at each end of the transport element.
Figure 6B:
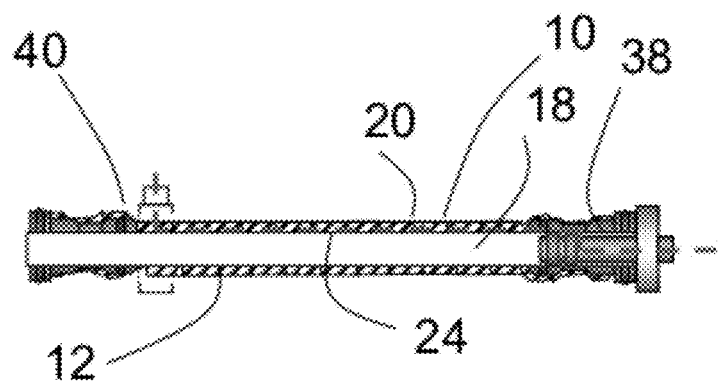
FIG. 6B is a side cross-sectional view of the transport element of FIG. 1 with an external electrode positioned at one end of the transport element and an internal electrode positioned at a second end of the transport element.
Figure 6C:
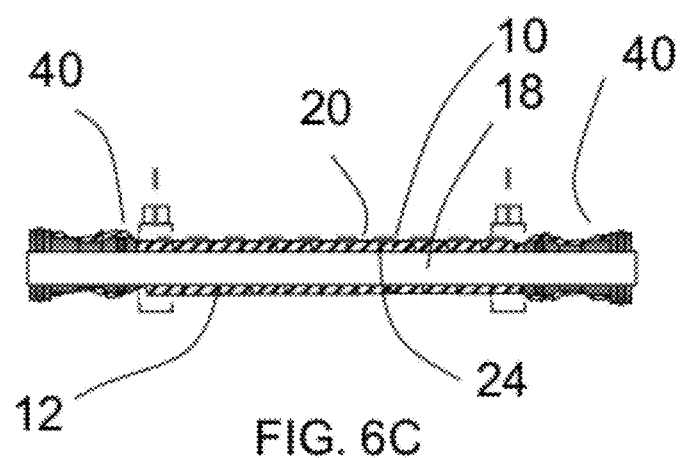
FIG. 6C is a side cross-sectional view of the transport element of FIG. 1 with two external electrodes positioned at each end of the transport element

The homogeneity of the resistance between the various paths illustrated in FIGS. 6A-C is demonstrated through similar electrical resistance results, as discussed in more detail below for each configuration. In each configuration, the electrical resistance results were approximately the same. In these embodiments, the electrical resistance per length may be within a range of $10^5$ to $10^9$ $\Omega$/meter, more particularly within a range of $10^6$ to $10^8$ $\Omega$/meter, and even more particularly within a range of $10^6$ to $10^7$ $\Omega$/meter.

In one configuration, as shown in FIG. 6A, two internal electrodes 38 are positioned at each end of the pipe 12. When a charge is applied to the pipe 12, the electrostatic charge (as indicated by the broken line) travels through the inner surface 24 of the pipe 12 between the two internal electrodes 38. In the embodiments of the pipe 12 that include the inner structural layer 26, such as the embodiments illustrated in FIGS. 3 and 4, the electrostatic charge travels through the inner structural layer 26 between the two internal electrodes 38. In these embodiments, the electrical resistance to electrical flow through the inner surface 24 and between the two internal electrodes 38 was measured to be 16.9 K$\Omega$. In other embodiments, in which the various layers 14, 26, 28 of the pipe 12 comprise materials that exhibit a higher resistance, the electrical resistance per length was measured to be 2.99 $10^6$ $\Omega$/meter.

As shown in FIG. 6B, an external electrode 40 is positioned at one end of the pipe 12 and the internal electrode 38 is positioned at a second end of the pipe 12. When a charge is applied to the pipe 12, the electrostatic charge (as indicated by the broken line) travels through the thickness of the pipe 12 adjacent the external electrode 40 and the inner surface 24 of the pipe 12 between the internal electrode 38 and the external electrode 40. In the embodiments of the pipe 12 that may include the inner structural layer 26, such as the embodiments illustrated in FIGS. 3 and 4, the electrostatic charge travels through the thickness of the pipe 12 adjacent the external electrode 40 and the inner structural layer 26 between the internal electrode 38 and the external electrode 40. In these embodiments, the electrical resistance to electrical flow through the inner surface 24 and the thickness of the pipe 12 between the internal electrode 38 and the external electrode 40 was measured to be 16.2 K$\Omega$. In other embodiments, in which the various layers 14, 26, 28 of the pipe 12 comprise materials that exhibit a higher resistance, the electrical resistance per length was measured to be 2.96 $10^6$ $\Omega$/meter.

As shown in FIG. 6C, two external electrodes 40 are positioned at each end of the pipe 12. When a charge is applied to the pipe 12, the electrostatic charge (as indicated by the broken line) travels through the outer surface 20 of the pipe 12 between the two external electrodes 40. In the embodiments of the pipe 12 that include the outer resin layer 28, such as the embodiments illustrated in FIG. 3, the electrostatic charge travels through the outer resin layer 28 between the two external electrodes 40. In these embodiments, the electrical resistance to electrical flow through the outer surface 20 and between the two external electrodes 40 was measured to be 16.1 K$\Omega$. In other embodiments, in which the various layers 14, 26, 28 of the pipe 12 comprise materials that exhibit a higher resistance, the electrical resistance per length was measured to be 2.92 $10^6$ $\Omega$/meter.

The standard for static dissipation time is set forth in SAE J 1645. The static dissipation time for the pipe 12 was measured to be 0.03 s.

The pipe 12 was also tested for strain. The pipe 12 was subjected to 5000 V/m during 1 minute. The pipe 12 was observed after the strain test for any signs of strain failure. No degradation of the pipe 12 occurred, and no sparks were observed. Furthermore, the temperature of the pipe 12 remained below 60° C.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A transport element for dissipating electrostatic charge comprising:
   at least two outer structural layers coupled in an overlapping arrangement, wherein the at least two outer structural layers are arranged to form a generally cylindrical shape having an inner surface and an outer surface,
   wherein an electrical resistance to an electrostatic charge traveling along the inner surface of the cylindrical shape, an electrical resistance to an electrostatic charge traveling along the outer surface of the cylindrical shape, and an electrical resistance to an electrostatic charge traveling between the inner surface and the outer surface of the cylindrical shape are approximately the same and are within a range of $10^5$ to $10^8$ $\Omega$/meter.

2. The transport element of claim 1, further comprising:
   an inner structural layer coupled to the inner surface of the cylindrical shape, wherein the inner structural layer comprises thermoplastic materials that may be formed into a nonlinear shape without a loss of structural integrity.

3. The transport element of claim 2, wherein an electrical resistance to an electrostatic charge traveling along the inner structural layer, the electrical resistance to the electrostatic charge traveling along the outer surface of the cylindrical shape, and an electrical resistance to an electrostatic charge traveling between the inner structural layer and the outer surface of the cylindrical shape are approximately the same and are within a range of $10^5$ to $10^8$ Ω/meter.

4. The transport element of claim 1, wherein each outer structural layer comprises a combination of resin and at least one of glass fibers, carbon fibers, and polyaramide fibers.

5. The transport element of claim 1, wherein each outer structural layer is overlapped by the other outer structural layer by at least 50%.

6. A transport element for dissipating electrostatic charge comprising:
at least two outer structural layers coupled in an overlapping arrangement, wherein the at least two outer structural layers are arranged to form a generally cylindrical shape having an inner surface and an outer surface; and
an outer resin layer coupled to the outer surface of the cylindrical shape, wherein the outer resin layer comprises materials that display a distinctive appearance when viewed under an ultraviolet light,
wherein an electrical resistance to an electrostatic charge traveling along the inner surface of the cylindrical shape, an electrical resistance to an electrostatic charge traveling along the outer resin layer, and an electrical resistance to an electrostatic charge traveling between the inner surface of the cylindrical shape and the outer resin layer are approximately the same and are within a range of $10^5$ to $10^8$ Ω/meter.

7. The transport element of claim 6, further comprising:
an inner structural layer coupled to the inner surface of the cylindrical shape, wherein the inner structural layer comprises thermoplastic materials that may be formed into a nonlinear shape without loss of structural integrity.

8. The transport element of claim 6, wherein each outer structural layer comprises a combination of resin and at least one of glass fibers, carbon fibers, and polyaramide fibers.

9. The transport element of claim 6, wherein each outer structural layer is overlapped by the other outer structural layer by at least 50%.

10. The transport element of claim 7, wherein an electrical resistance to an electrostatic charge traveling along the inner structural layer, the electrical resistance to the electrostatic charge traveling along the outer resin layer, and an electrical resistance to an electrostatic charge traveling between the inner structural layer and the outer resin layer are approximately the same and are within a range of $10^5$ to $10^8$ Ω/meter.

* * * * *

UNITED STATES PATENT AND TRADEMARK OFFICE
CERTIFICATE OF CORRECTION

PATENT NO. : 8,630,079 B2  
APPLICATION NO. : 13/229834  
DATED : January 14, 2014  
INVENTOR(S) : Christophe Le Morvan Page 1 of 1

It is certified that error appears in the above-identified patent and that said Letters Patent is hereby corrected as shown below:

On the Title page of the patent:

Item (*) Notice: should be corrected to delete "This patent is subject to a terminal disclaimer."

Signed and Sealed this
First Day of November, 2016

Michelle K. Lee
*Director of the United States Patent and Trademark Office*